United States Patent [19]

Suzuki et al.

[11] 4,411,780
[45] Oct. 25, 1983

[54] SEWAGE DISPOSAL PLANT

[75] Inventors: Kensuke Suzuki, Tokyo; Sunao Okada, Nishinomiya, both of Japan

[73] Assignee: Nipon Sangyo Kikai Kabushiki Kaisha, Tokyo, Japan

[21] Appl. No.: 347,436

[22] Filed: Feb. 10, 1982

[30] Foreign Application Priority Data

Feb. 19, 1981 [JP] Japan .............................. 56/22382[U]

[51] Int. Cl.³ .............................................. C02F 3/04
[52] U.S. Cl. .................................. 210/150; 210/195.1; 210/615; 210/220; 261/DIG. 75
[58] Field of Search ............... 210/220, 615, 150, 151, 210/221.1, 194, 198.1, 195.4, 170, 747, 199, 195.1; 261/DIG. 75, 121 R

[56] References Cited

U.S. PATENT DOCUMENTS

| | | | |
|---|---|---|---|
| 4,100,071 | 7/1978 | Beurer et al. | 210/218 |
| 4,217,211 | 8/1980 | Crane | 261/DIG. 75 |
| 4,278,546 | 7/1981 | Roesler | 210/199 |
| 4,308,144 | 12/1981 | Saito | 210/220 |

FOREIGN PATENT DOCUMENTS

| | | | |
|---|---|---|---|
| 52-41455 | 3/1977 | Japan | 210/150 |
| 53-30159 | 3/1978 | Japan | 210/151 |
| 56-49637 | 11/1981 | Japan | 210/150 |

*Primary Examiner*—Benoît Castel
*Attorney, Agent, or Firm*—James E. Nilles

[57] ABSTRACT

A sewage disposal plant comprising a deep-well type sewage treatment tank, which is provided with string-shaped contact members stretched therein, and which minimizes the installation area; a circulator pipe inserted into the sewage treatment tank and having a venturi portion at an intermediate section thereof; and an air intake pipe inserted into the circulator pipe extending into the venturi portion thereof, whereby exposure air can be sucked into the venturi portion of the circulator pipe naturally without using a compressor, thus saving power. Said string-shaped contact members has therearound ring type fuzzy hairs consisting of fibers.

1 Claim, 5 Drawing Figures

SEWAGE DISPOSAL PLANT

BACKGROUND OF THE INVENTION

1. Field of the Invention

This invention relates to a sewage disposal plant for treating sewage consisting of organic waste water, such as municipal sewage, raw sewage and industrial waste water.

2. Description of the Prior Art

The biological sewage-treating techniques including a technique utilizing activated sludge, which is typical of the mentioned techniques, have heretofore been practically used for treating organic waste water. In recent years, saving energy has become an important consideration, and it has become difficult to obtain a large site for a sewage disposal plant. Under these circumstances, there is a strong demand for an economical and compact sewage disposal plant that is able to cope with these problems.

SUMMARY OF THE INVENTION

An object of the present invention is to provide a sewage disposal plant capable of coping with the above-mentioned problems and consisting of a deep-well type sewage treatment tank, which is provided with string-shaped contact members stretched therein, and which minimizes the installation area; a circulator pipe inserted into the sewage treatment tank and having a venturi portion at an intermediate section thereof; and an air intake pipe inserted into the circulator pipe extending into the venturi portion thereof, whereby exposure air can be sucked into the venturi portion of the circulator pipe naturally without using a compressor, thus saving power.

The above and other objects and advantageous features of the invention will become apparent from the following description of the preferred embodiment taken in conjunction with the accompanying drawings.

DESCRIPTION OF THE PREFERRED EMBODIMENTS

Figure 1:
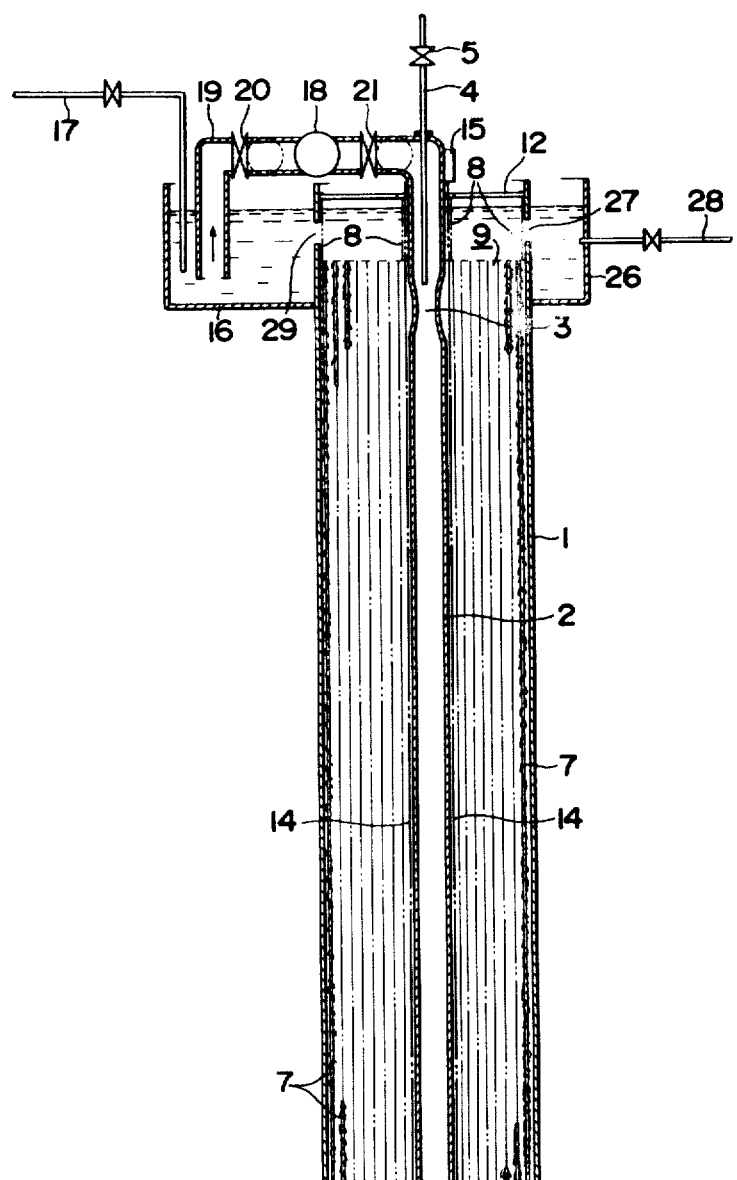
FIG. 1 is a front elevational view in longitudinal section of an embodiment of a sewage disposal plant according to the present invention.
Figure 2:
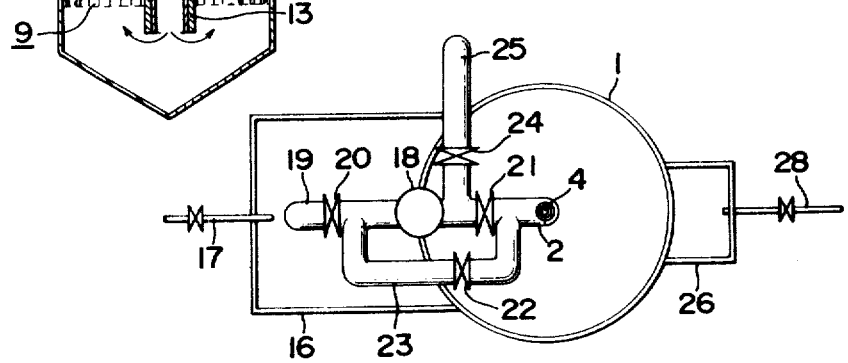
FIG. 2 is a top plan view of the embodiment.
Figure 3:
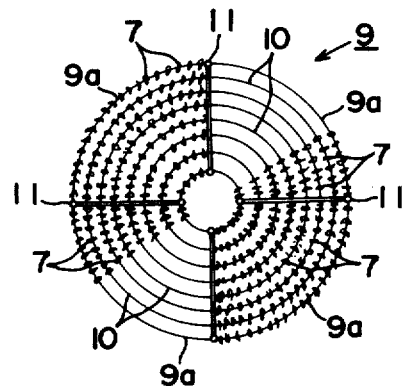
FIG. 3 is a plan view of string type contact members and a support frame therefor.
Figure 4:
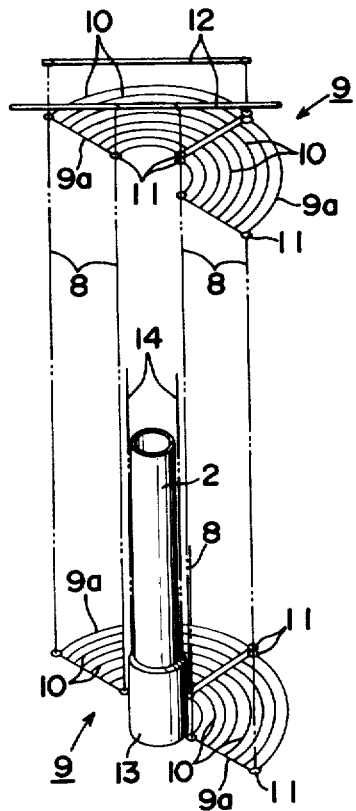
FIG. 4 is a perspective view of a part of the string type contact members and support frame therefor.
Figure 5:
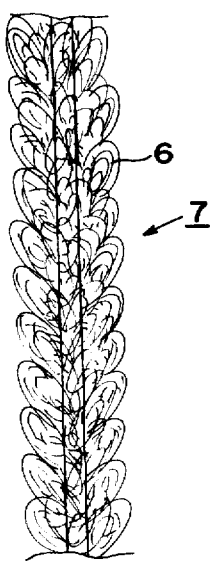
FIG. 5 is an enlarged front elevational view of a part of a string type contact member.

Reference numeral 1 denotes a sewage treatment tank in the shape of a deep well having a depth of 20-30 m. A circulator pipe 2 is inserted into the central portion of the sewage treatment tank 1 extending vertically to near the bottom, and the upper end is projected above the surface of the water in the sewage treatment tank 1. The circulator pipe 2 has a venturi portion 3 close to the top. An air suction pipe 4 is inserted into the circulator pipe 2 through the wall of an upper end portion, opening in the venturi portion 3. The air suction pipe 4 is provided with an air control valve 5 at an intermediate portion thereof. A plurality of string-shaped contact members 7, each of which has therearound ring type fuzzy hairs 6 consisting of thin fibers, are stretched vertically in the sewage treatment tank 1. The string-shaped contact members 7 are stretched between support frames 9, 9, which are joined in a suspended state to ropes 8 such that the support frames 9, 9 are positioned in upper and lower portions of the interior of the sewage treatment tank 1. Each support frame 9 is divided into several fan-shaped frame members 9a surrounding the circulator pipe 2. Each of the fan-shaped frame members 9a has concentrically extended support rods 10 inside it, to which upper and lower ends of the string-shaped contact members 7 are fastened. Each of the fan-shaped frame members 9a is provided with rope retainer rings 11 at inner and outer ends thereof, and the rope retainer rings 11 of adjacent fan-shaped frame members 9a are joined together by means of ropes 8 inserted therethrough. Thus, the several fan-shaped frame members 9a are connected together in the shape of a ring to form the support frame 9. The upper ends of the ropes 8, from which the upper and lower support frames 9, 9 are suspended, are joined to support rods 12 provided at an upper portion of the sewage treatment tank 1. The plurality of string-shaped contact members 7 are thus vertically stretched in the sewage treatment tank 1. An extension pipe 13 is fitted slidably around the outer circumferential surface of a lower portion of the circulator pipe 2. The extension pipe 13 is suspended from a rope 14, which is connected to a winding pulley 15 secured to an upper portion of the circulator pipe 2. A circulating water receiving tank 16 is formed in contact with one side surface of an upper portion of the sewage treatment tank 1 and communicated therewith at a circulation port 29. An untreated water supply pipe 17 is inserted into the circulating water receiving tank 16, and a water suction pipe 19 having a circulating pump 18 at an intermediate portion thereof extends outward therefrom, the water suction pipe 19 being communicated with the circulator pipe 2 at the upper end thereof. The water suction pipe 19 is provided with change-over valves 20, 21 between a suction end thereof and the circulating pump 18, and between the circulating pump 18 and the upper end of the circulator pipe 2, respectively. That portion of the water suction pipe 19 which is between one change-over valve 20 and the circulating pump 18, and that portion of the water suction pipe 19 which is between the other change-over valve 21 and the upper end of the circulator pipe 2, are communicated with each other with a sludge extracting by-pass pipe 23 having a change-over valve 22 at an intermediate portion thereof. A sludge discharge pipe 25 having a change-over valve 24 at an intermediate portion thereof extends to the outside from a portion of the water suction pipe 19 between the circulating pump 18 and change-over valve 21. A treated water receiving tank 26 is formed on the side of the upper portion of the sewage treatment tank 1 opposite the circulating water receiving tank 16. The treated water receiving tank 26 is communicated with the sewage treatment tank 1 via a treated water discharge port 27, and a treated water discharge pipe 28 extends outside from the treated water receiving tank 26.

The operation of the above embodiment will now be described.

The water to be treated is introduced through the untreated water supply pipe 17 to fill the sewage treatment tank 1 and circulating water receiving tank 16.

The circulating pump 18 is then operated to send the water to be treated into the circulator pipe 2 under pressure. The water to be treated, which has been introduced under pressure into the circulator pipe 2, naturally absorbs air through the air suction pipe 4 at the venturi portion 3 and carries the air to the lower end of the circulator pipe 2. The water reaching the lower end of the circulator pipe 2 turns around and flows upward in close contact with the plurality of string-shaped contact members 7 stretched vertically in the sewage treatment tank 1. The water flowing upward is oxidized with the activated sludge deposited on the members 7, to reach the upper portion of the sewage treatment tank 1. Only an amount of the water reaching the upper portion of the sewage treatment tank 1 corresponding to the amount of untreated water introduced into the circulating water receiving tank 16 and sewage treatment tank 1 is discharged from the treated water discharge port 27 into the treated water receiving tank 26.

The exposure air naturally absorbed by the downwardly flowing water in the venturi portion 3 is agitated naturally and mixed with the water by the time it has been carried to the lower end of the circulator pipe 2. At the same time, the solubility of the oxygen is gradually increased due to the depth pressure.

The water with large quantities of oxygen dissolved therein at the lower end of the circulator pipe 2 turns around to rise in the sewage treatment tank 1 at a reduced flow velocity of 2–3 m per minute in contact with the string-shaped contact members 7. While the water being treated flows upward, it comes into contact with a large amount of sludge (microorganisms) sticking to and held on the string-shaped contact members 7, and is oxidized. At this time, the air bubbles carried by the water being treated are separated therefrom to float, shaving off the excess sludge sticking to the string-shaped contact members 7. The circulation of water is then repeated. The ratio of the flow velocities of the downwardly moving water to that of the upwardly moving water is usually 50:1. Due to such a ratio of flow velocity of the downwardly moving water to that of the upwardly moving water, and the difference between the specific gravity of the former and that of the latter, the degenerated sludge precipitates at the lower portion of the sewage treatment tank 1 when the water being treated turns around at the lower end of the circulator pipe 2.

The precipitated sludge accumulated in the lower portion of the sewage treatment tank 1 is sucked up periodically by circulating pump 18 and discharged to the outside. In order to discharge the sludge in the lower portion of the tank 1 to the outside, first the circulating pump 18 is stopped, change-over valves 20, 21 are closed, and change-over valves 22, 24 are opened. When the circulating pump 18 is then operated, the sludge is sucked up through the circulator pipe 2, by-pass pipe 23 and sludge discharge pipe 25 to be discharged to the outside. The extension pipe 13 fitted around the lower portion of the circulator pipe 2 is lowered by moving the suspension rope 14 downward in accordance with the amount of the sludge accumulated in the lower portion of the sewage treatment tank 1, to suck up and discharge the highly concentrated sludge to the outside. After the sludge has been discharged to the outside, the extension pipe 13 is lifted by rotating the winding pulley 15, and the change-over valves 20, 21, 22, 24 are switched back to conduct the sewage-circulating operation.

According to the present invention, a circulator pipe, communicated with the suction pipe for sucking the water to be treated into the deep-well type sewage treatment tank, is inserted into the tank, and an air suction pipe is inserted into the circulator pipe so as to open in a venturi portion thereof, formed at an intermediate portion of the circulator tube. Therefore, the exposure air is naturally sucked at the venturi portion of the circulator pipe into the main portion thereof. This makes the use of an exposure air compressor unnecessary, so that a lot of power for forcing exposure air into the circulator pipe can be saved. Since a plurality of string type contact members are provided in the sewage treatment tank in such a manner that the contact members are stretched parallel to the axis of the tank, i.e. parallel to the direction in which the water being treated flows, the water flows smoothly in spite of the sludge sticking thereto. Furthermore, the oxygen dissolved in the water being treated, due to the depth pressure turns to bubbles while the water flows upward, and is separated therefrom to flow upward. The bubbles flowing upward separate the excess sludge sticking to the string type contact members, automatically controlling the amount of sludge sticking to the contact members. This allows a constantly stable sewage treatment operation to be carried out. Since the sewage treatment tank is in the shape of a deep well, the installation area can be minimized, and the construction cost is low as compared with that of an elevated swewage disposal tank.

(I) Considering construction and operation of the present invention in more detail, circulator pipe 2 is inserted in the vertical direction into the center of deep well type sewage treatment tank 1, air suction pipe 4 is inserted into the circulator pipe 2 so as to open in a venturi portion 3 thereof, circulating water receiving tank 16 for receiving therein untreated water is so formed as to communicate with the sewage treatment tank 1 at one side of an upper portion thereof, and a water suction pipe 19 extending outward from the interior of the circulating water receiving tank 16 communicates via circulating pump 18 provided at an intermediate portion thereof with the circulator pipe 2 at an upper portion thereof. Accordingly, the untreated water pressed down in the circulator pipe 2 is returned at the lower end thereof, elevated in the deep well type sewage treatment tank 1, pressed down again and circulated through the circulating water receiving tank 16 by circulating pump 18, and air is sucked into the water circulated in circulator pipe 2, so that no compressor for exposure is required, thus saving power. (II) In the present invention, the plurality of string-shaped contact members 7 having there-around a number of ring type fuzzy hairs 6 are provided in the sewage treatment tank 1 in such a manner that the contact members 7 are extended in a tensile state between the pair of upper and lower supports 9,9. Accordingly, in the present invention the contact oxidizing effect can be enhanced because the string-shaped contact members 7 having there-around ring type fuzzy hairs 6 have a number of gaps suitable for fixing and increasing the organic sludge and the surface area is very large with respect to the length of the contact members 7. Further, the spaces between contact members 7 are formed and extend from the lower portion to the upper portion thereof without being interrupted, because each of the string-shaped contact members 7 is extended vertically in a tensile state between the upper and lower supports 9,9 in treatment tank 1. Accordingly, the untreated water elevating in treatment tank 1 from the lower portion to the upper portion thereof by circulating pump 18 flows at a constant velocity while intimately contacting the entire surface of the string-shaped contact members 7 to which activated sludge is attached, without retaining or accumulating due to a partial change in velocity or eddy currents, thereby causing the untreated water to be treated effectively and preventing clogging of the contact members 7 due to sludge, which is a weak point in the contact oxidizing treating system.

If excess sludge sticks to the string-shaped type contact members 7 due the high concentration of untreated water, the contact members 7 extended between the upper and lower supports 9,9 could be damaged at the middle portions thereof, because the middle portions are free and movable. In the present invention, however, the string-shaped type contact members 7 having thereon excess sludge offer resistance to the current and move or sway as a water plant, so that excess sludge is separated from the contact members 7 by the water and bubbles flowing upward and stable sewage treatment can always be carried out. The phenomenon that excess sludge is automatically separated is notable, especially in a deep well type treating tank wherein the flexible portion of the string-shaped contact members 7 can be made lengthy. Further, the separated sludge falls down through spaces between the vertical string-shaped contact members 7 and is accumulated on the bottom surface of the treatment tank 1, without remaining in between the spaces, so that no clogging is generated.

(III) In the present invention, first and second change-over valves 20, 21 are provided in water suction pipe 19 at both sides of circulating pump 18 inserted in the water suction pipe 19, by-pass pipe 23 communicates via third change-over valve 22 with water suction pipe 19 at the downstream sides of the first and second change-over valves 20, 21, sludge discharge pipe 25 having a fourth change-over valve 24 at an intermediate portion thereof is extended from a portion of water suction pipe 19 between the circulating pump 18 and the second change-over valve 21, and extension pipe 13 is fitted slidably up and down on a lower portion of circulator pipe 2 communicating with the water suction pipe 19. Accordingly, the first and second change-over valves 22, 24 are opened, the extension pipe 13 is lowered to extend the circulator pipe 2 at the position of accumulated sludge, and the circulating pump 18 is operated when sludge is accumulated on the bottom of the water treatment tank 1, so that the accumulated sludge can be sucked through the circulator pipe 2 and discharged through the by-pass pipe 23, the water suction pipe 19 and the sludge discharge pipe 25.

Further, a mode of water circulation such that water is sucked through water suction pipe 19 into circulator pipe 2 and that water discharged from the lower end of circulator pipe 2 flows from the lower portion to the upper portion of water treatment tank 1 can be repeated as follows: by opening the first and second change-over valves 20, 21, closing the third and fourth change-over valves 22, 24, elevating the extension pipe 13 by the winding pulley 15, and operating the circulating pump 18 after the accumulated sludge has been discharged. Accordingly, both water circulation and sludge discharging can be carried out by circulating pump 18 and circulator pipe 2.

What is claimed is:

1. A sewage disposal plant comprising a deep well type sewage treatment tank, a circulator pipe inserted vertically into the central portion of said sewage treatment tank and having a venturi portion at an intermediate section thereof, an air suction pipe inserted into said circulator pipe so as to open in said venturi portion thereof, an extension pipe fitted slidably up and down on a lower portion of said circulator pipe and connected to a winding pulley secured to an upper portion of said circulator pipe, a plurality of string-shaped contact members having therearound a number of ring type fuzzy hairs and provided in said sewage treatment tank in such a manner that said contact members are extended vertically in a tensile state between a pair of support frames fixed on upper and lower portions of the interior of said sewage treatment tank, a circulating water receiving tank for receiving therein untreated water so formed so as to be communicated with said sewage treatment tank at one side of an upper portion thereof, a water suction pipe extended outward from the interior of said circulating water receiving tank and communicated via a circulating pump provided at an intermediate portion thereof, with said circulator pipe at an upper portion thereof, first and second change-over valves inserted in said water suction pipe at both sides of said circulating pump, respectively, a by-pass pipe communicated via a third change-over valve with said water suction pipe at the downstream sides of said first and second change-over valves, a sludge discharge pipe having a fourth change-over valve at an intermediate portion thereof extending from a portion of said water suction pipe between said circulating pump and said second change-over valve, and a treated water receiving tank so formed as to be communicated with said sewage treatment tank at the other side of an upper portion thereof.

* * * * *